United States Patent [19]

Schmeidl

[11] Patent Number: 4,923,972
[45] Date of Patent: May 8, 1990

[54] PREPARATION OF LIQUID FORMULATIONS OF BASIC AZO DYES IN CARBOXYLIC ACID SOLUTION AND SUBSEQUENT HEATING

[75] Inventor: Karl Schmeidl, Ludwigshafen, Fed. Rep. of Germany

[73] Assignee: BASF Aktiengesellschaft, Ludwigshafen, Fed. Rep. of Germany

[21] Appl. No.: 181,579

[22] Filed: Apr. 14, 1988

[30] Foreign Application Priority Data

Apr. 23, 1987 [DE] Fed. Rep. of Germany ....... 3713617

[51] Int. Cl.$^5$ .................... C09B 29/085; C09B 37/00; C09B 67/10; C09B 67/34
[52] U.S. Cl. ...................................... 534/677; 534/573; 534/676; 534/576; 534/887; 534/579; 534/575
[58] Field of Search ............... 534/576, 676, 579, 677, 534/856, 573 M

[56] References Cited

U.S. PATENT DOCUMENTS 2,007,382 7/1935 Ockman et al. ..................... 534/575
2,022,606 11/1935 Smith ............................. 534/677 X
3,346,322 10/1967 Finkenauer et al. ............ 534/576 X
3,696,089 10/1972 Raur et al. .......................... 534/576
3,928,314 12/1975 Rochat et al. ....................... 534/579
4,400,321 8/1983 Linhart et al. ...................... 534/677

FOREIGN PATENT DOCUMENTS 0036553 9/1981 European Pat. Off. ............ 534/576
0046237 2/1982 European Pat. Off. ............ 534/576
2086684 8/1971 France ................................ 534/677

Primary Examiner—Floyd D. Higel
Attorney, Agent, or Firm—Oblon, Spivak, McClelland, Maier & Neustadt

[57] ABSTRACT

Liquid formulations of basic azo dyes are prepared from unsubstituted or $C_1$–$C_4$-alkyl- or $C_1$–$C_4$-alkoxy-substituted m-phenylenediamine by diazotizing and coupling in carboxylic acid solution, which comprises performing the reaction with 0.76 to 0.95 mole of nitrile, calculated as nitrous acid and based on 1 mole of m-phenylenediamine, and then heating the resulting reaction mixture at from 60° C. to the boiling point of the reaction mixture.

2 Claims, No Drawings

PREPARATION OF LIQUID FORMULATIONS OF BASIC AZO DYES IN CARBOXYLIC ACID SOLUTION AND SUBSEQUENT HEATING

The present invention relates to a novel process for preparing liquid formulations of basic azo dyes from substituted or unsubstituted m-phenylenediamine by diazotizing and coupling in carboxylic acid solution, the reaction being carried out in the presence of from 0.76 to 0.95 mole of nitrite, calculated as nitrous acid and based on 1 mole of m-phenylenediamine, and the resulting reaction mixture being subsequently heated at from 60° C. to the boiling point of the reaction mixture.

EP-A-36,553 discloses diazotizing and coupling substituted or unsubstituted m-phenylenediamine in carboxylic acid solution using sodium nitrite or neopentylglycol nitrite as diazotizing reagent, the critical amount of nitrite being said to be 0.73 mole of nitrite, calculated as nitrous acid and based on 1 mole of m-phenylenediamine. According to said EP-A-36,553, if this nitrite level is exceeded, the liquid formulations give off nitrogen.

We have found, then, that liquid formulations of basic azo dyes are advantageously obtainable from unsubstituted or $C_1$–$C_4$-alkyl- or $C_1$–$C_4$-alkoxy-substituted m-phenylenediamine by diazotizing and coupling in carboxylic acid solution by performing the reaction with from 0.76 to 0.95 mole of nitrite, calculated as nitrous acid and based on 1 mole of m-phenylenediamine, and then heating the resulting reaction mixture at from 60° C. to the boiling point of the reaction mixture.

Surprisingly, liquid dyes prepared by the process according to the invention do not give off nitrogen on storage. In addition, the dyes prepared by the process according to the invention show higher bath exhaustion and enhanced storage stability.

The starting material for the azo dyes is unsubstituted or $C_1$–$C_4$-alkyl- or $C_1$–$C_4$-alkoxy-substituted m-phenylenediamine. Preferably, the m-phenylenediamine is unsubstituted or substituted in the ring by methyl or methoxy. Specific examples are m-phenylenediamine, 1-methyl-2,4-diaminoaminobenzene, 1-methyl-2,6-diaminobenzene and 1-methoxy-2,4-diaminobenzene. It is also possible to use mixtures of various m-phenylenediamines.

In some cases it can be advantageous to replace up to 40 mol% of the particular m-phenylenediamine by unsubstituted or $C_1$–$C_4$-alkyl- or $C_1$–$C_4$-alkoxy-substituted aniline. If monoamines, in particular unsubstituted aniline, are used, the amount of nitrite used is correspondingly reduced.

Examples of nitrites suitable for the diazotization are alkali metal nitrites, in particular alkyl nitrites which turn into solvents after the reaction. Alkyl nitrites of this type are described for example in DE-A-2,144,420. Specific examples are propylene glycol nitrite, dipropylene glycol dinitrite or neopentylglycol dinitrite. A suitable alkali metal nitrite is in particular sodium nitrite.

Examples of suitable solvents are $C_1$–$C_4$-alkanoic acids which may be substituted for example by fluorine, chlorine, hydroxyl or methoxy. Specific examples are fluoroacetic acid, chloroacetic acid, dichloroacetic acid, hydroxyacetic acid and methoxyacetic acid. Particular preference is given to formic acid, acetic acid or propionic acid.

The solution medium may further contain water or other solvents, such as alkanols, glycols, glycol ethers, amides or esters, for example methanol, ethanol, propanol, isopropanol, ethylene glycol, diethylene glycol, propylene glycol, dipropylene glycol, ethylene glycol monomethyl, monoethyl, monopropyl or monobutyl ether, N,N-dimethylformamide, N-methylpyrrolidone or γ-butyrolacetone.

Advantageously, the solution medium used for diazotization and coupling contains about 50–90% by weight, preferably from 70 to 80% by weight, of carboxylic acid, the remainder being water.

The mixing ratios between the reactants and solvents are conveniently selected in such a way that the liquid basic is a dye formulation prepared according to the invention have a dye content of about 15–40% by weight.

The process according to the invention is conveniently carried out in such a way that the particular m-phenylenediamine or the mixture of m-phenylenediamines of the m-phenylenediamine/aniline mixture is introduced initially in carboxylic acid solution and the diazotizing agent is then added.

The nitrite is added at from $-10°$ to $+25°$ C., preferably at from $+15°$ to $+20°$ C. After the addition is complete, the reaction mixture is stirred at that temperature for from 0.5 to 4 hours and then heated at from 60° C. to the boiling point of the reaction mixture. The boiling point of the reaction mixture is in general about 108° C. Preferably, the heat treatment takes place at from 70° to 100° C., in particular at from 80° to 95° C. A temperature above the boiling point of the reaction mixture, under superatmospheric pressure, does not produce any further benefits. This heat treatment extends over a period from 1 to 10 hours, prerferably from 3 to 6 hours.

The dyes prepared by the process according to the invention are generally not uniform dyes but mixtures of monoazo, disazo and polyazo dyes, since the diamine starting material and the products derived therefrom are not just singly but multiply diazotized and coupleable. The main components in the dyes have the following formula:

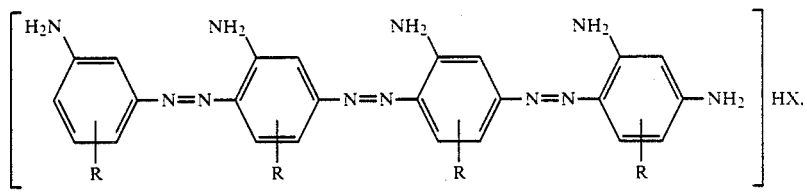

where R is hydrogen, $C_1$–$C_4$-alkyl or $C_1$–$C_4$-alkoxy, and HX is an acid, customarily the carboxylic acid used as solvent.

Similar products to the dyes obtained by the process according to the invention are known for example as Bismarck Brown G or R or vesuvin or as described in EP-A-36,553. They are used for coloring paper, in particular waste paper derived stock, or leather or even for dyeing anionically modified fibers, for example acrylonitrile polymers. By blending with other basic dyes it is also possible to standardize to other hues, for example black.

The Examples which follow serve to illustrate the invention in more detail. The parts are by weight.

EXAMPLE 1

130 parts of 1-methyl-2,4-diaminobenzene and 70 parts of 1-methyl-2,6-diaminobenzene were dissolved with stirring in 515 parts of 85% strength by weight aqueous acetic acid. The solution was cooled down to from 20° to 20° C., and 122 parts of neopentylglycol dinitrite were added in the course of 4.5 hours, during which external cooling was applied to ensure that 20° C. was not exceeded. Stirring was then continued for about 4 hours with the temperature coming back up to room temperature. The temperature was then raised to 65° C. in the course of a further hour, was then raised to the reflux temperature (108° C.) in the course of a further 2 hours, and was maintained at that level for one hour. The mixture was then cooled back to room temperature and filtered through a clarifying filter. There was no filter residue. The filtrate was standardized to the desired color strength by adding about 130 parts of acetic acid. The result obtained was a dye solution which was infinitely dilutable with water and colored waste paper derived stock in a reddish brown shade. The wastewater from the wet-end coloring was colorless.

EXAMPLE 2

354 parts of m-phenylenediamine were dissolved in a mixture of 844 parts of glacial acetic acid and 148 parts of water. 244 parts of neopentylglycol dinitrite were then added at from 9° to 15° C. in the course of about 4 hours. The reaction mixture was warmed to room temperature in the course of about 2 hours, then gradually heated to 65° C., maintained at that temperature for 2 hours and then heated with continued stirring at 95° C. for 1 hour, then cooled down and diluted with 260 parts of glacial acetic acid. The dye solution thus obtained was stable to storage and miscible with water. Compared with the solution obtained in Example 1, the wet-end coloring of waste paper derived stock was somewhat yellower and purer. The color strength was about 15% higher. The wastewater from the wet-end coloring was not colored.

In place of glacial acetic acid it is also possible to use ethylene diglycol monobutyl ether, propylene glycol or butyrolactone, neat or diluted with water, for the diluting.

EXAMPLE 3

Example 2 was repeated, except that the 244 parts of neopentylglycol dinitrite were reduced to 212 parts and, after completed diazotization and coupling, the dilution was effected with 292 parts of 50% strength by weight aqueous acetic acid. (The dilution can also be carried out with the same amount of 50% strength by weight aqueous lactic acid).

The result obtained was a liquid formulation which was stable to storage and infinitely dilutable with water. Compared with the products obtained in EP-A-36,553, not only the storage stability but also the dilutability with water and the affinity for paper were improved.

EXAMPLE 4

177 parts of m-phenylenediamine were dissolved in 516 parts of 85% strength by weight aqueous acetic acid. The solution was cooled down to about 5° C., and 90.5 parts of sodium nitrite were added in the course of about 2 hours. The temperature was kept below 15° C. by external cooling. This was followed by stirring for about 1 hour and then heating to 95° C. in the course of about 5 hours. The solution was then cooled down and diluted with 141.5 parts of 50% strength by weight aqueous acetic acid. The result obtained was a dye having similar properties to those described in Example 3.

I claim:

1. A process for preparing a liquid formulation of a basic azo dye from unsubstituted or $C_1$–$C_4$-alkyl- or $C_1$–$C_4$-alkoxy-substituted m-phenylenediamine by diazotizing and coupling in carboxylic acid solution, which comprises performing the reaction with from 0.76 to 0.95 mole of nitrite, calculated as nitrous acid and based on 1 mole of m-phenylenediamine, and then heating the resulting reaction mixture at from 60° C. to the boiling point of the reaction mixture.

2. The process according to claim 1, wherein said reaction is carried out at −10° to +25° C.

* * * * *